United States Patent [19]

Takizawa et al.

[11] Patent Number: 5,894,458
[45] Date of Patent: Apr. 13, 1999

[54] APPARATUS FOR SUPPORTING AND CONNECTING A MAGNETIC FIELD MODULATION HEAD TO BE USED FOR A PHOTOMAGNETIC RECORDING INCLUDING A SPRING PLATE MEMBER HAVING A CONDUCTIVE PART ELECTRICALLY CONNECTING THE HEAD TO A SUPPORTING FRAME

[75] Inventors: Atsushi Takizawa; Tadashi Tomita; Shigeo Nakayama, all of Tokyo, Japan

[73] Assignee: Nippon Chemi-Con Corporation, Tokyo, Japan

[21] Appl. No.: 08/713,193

[22] Filed: Sep. 12, 1996

Related U.S. Application Data

[63] Continuation of application No. 08/258,828, Jun. 13, 1994, abandoned.

[30] Foreign Application Priority Data

| Jun. 11, 1993 | [JP] | Japan | 5-140482 |
| Jun. 11, 1993 | [JP] | Japan | 5-140485 |
| Jun. 11, 1993 | [JP] | Japan | 5-140522 |

[51] Int. Cl.⁶ .................. G11B 11/00; G11B 5/48
[52] U.S. Cl. .......................... 369/13; 360/104
[58] Field of Search ................ 369/13; 360/103, 360/104, 106, 107

[56] References Cited

U.S. PATENT DOCUMENTS

| 4,996,617 | 2/1991 | Yaeger et al. | 360/105 |
| 5,006,946 | 4/1991 | Matsuzaki | 360/104 |
| 5,124,864 | 6/1992 | Matsuzaki | 360/103 |
| 5,185,683 | 2/1993 | Oberg et al. | 360/104 |

FOREIGN PATENT DOCUMENTS

| 56-83870 | 7/1981 | Japan | 360/104 |
| 60-43253 | 3/1985 | Japan . | |
| 61-296580 | 12/1986 | Japan | 360/104 |
| 62-289981 | 12/1987 | Japan . | |
| 246578 | 2/1990 | Japan . | |

*Primary Examiner*—Allen T. Cao
*Attorney, Agent, or Firm*—Young & Thompson

[57] ABSTRACT

An apparatus is disclosed which mechanically supports and electrically connects a magnetic field modulation head for opto-magnetic recording to a supporting/connecting device. The magnetic field modulation head is in slidable contact with a surface of an opto-magnetic disc and is placed face-to-face with a laser pick-up device. The apparatus has a connecting spring member made of a conductive material. The connecting spring member has one end which joins a coil of the magnetic field modulation head with a coil of the magnetic field modulation head, and an opposite end which is fixed on a supporting member. The spring member has a pair of conductive pieces spaced apart from each other. The conductive pieces are made of a material which renders the coil conductive with the supporting member, the one end and the magnetic field modulation head being embedded in a composite resin material. To partially mechanically engage the conductive pieces together, an insulating engaging member may be used. Alternatively, the spring member may have a pair of conductive pieces spaced apart from each other and placed on a single insulating plate made of a flexible composite resin.

6 Claims, 4 Drawing Sheets

APPARATUS FOR SUPPORTING AND CONNECTING A MAGNETIC FIELD MODULATION HEAD TO BE USED FOR A PHOTOMAGNETIC RECORDING INCLUDING A SPRING PLATE MEMBER HAVING A CONDUCTIVE PART ELECTRICALLY CONNECTING THE HEAD TO A SUPPORTING FRAME

This application is a continuation of application Ser. No. 08/258,828, filed Jun. 13, 1994, now abandoned.

BACKGROUND OF THE INVENTION

1. Field of the Invention

The invention relates to an apparatus for mechanically supporting and electrically connecting a magnetic field modulation head to be used for a photomagnetic recording.

2. Description of the Prior Art

It has generally been known in the art that a photomagnetic disc is usable for photomagnetic recording. A conventional apparatus for mechanically supporting and electrically connecting the magnetic field modulation head will be described with reference to FIGS. 1A and 1B. A photomagnetic recording is carried out by contacting a magnetic field modulation head 10 with a surface of a photomagnetic disc 12 at such a contact pressure as to a the magnetic modulation head 10 to be slidable on the surface of the photomagnetic disc 12. The magnetic field modulation head 10 involves a magnetic field modulation coil 10a therein.

The magnetic field modulation head 10 is mechanically supported by a supporting member 20 comprising a metal spring plate which is mechanically fixed to a supporting frame 16. Namely, the magnetic field modulation head 10 is mounted through its mounting portion 20a to one end of the metal spring plate supporting member 20 whose opposite end is fixed to a top portion of the supporting frame 16. The spring plate supporting member has a bent portion which acts as a spring member. The magnetic field modulation head 10 is electrically connected through a conductive plate connecting member 22 for receiving electrical signals for the magnetic field modulation in which the conductive plate connecting member 22 is required to be made of an electrically conductive material to allow the electrical signals to be transmitted therethrough. The conductive plate connecting member 22 is also required to be a flexible member to allow the magnetic field modulation head 10 to exhibit a vertical motion to the surface of the photomagnetic disc 12. The magnetic field modulation head 10 is mounted at its top surface to one end of the conductive plate connecting member 22 whose opposite end is also fixed to the top portion of the supporting frame 16 so that the coil 10a involved in the magnetic field modulation head 10 is electrically connected through a wiring to the conductive plate connecting member 22. The spring plate supporting member 20 and the conductive plate connecting member 22 together constitute a supporting and connecting apparatus.

The supporting frame 16 is L-shaped extends upward and also extends in a lateral direction parallel to but apart from the photomagnetic disc 12. A laser beam pick up device 14 is provided within an end of the laterally extended portion of the supporting frame if, wherein the laser beam pick up device 14 is located at an opposite position to the magnetic field modulation head 10 through photomagnetic disc 12 in which the magnetic modulation coil 10a involved in the magnetic field modulation head 10 is positioned on an optical axis 24 of a lens in the laser beam pick up device 14.

A lift lever 26 may be provided for pushing up a bottom surface of the spring plate supporting member 20 to allow the magnetic field modulation head 10 to be apart from the surface of the photomagnetic disc 12. In detail, the lift lever 26 has a fixed end 26b and a free end 26a with a contact portion. The lift lever 26 is provided at its under surface with a displacement member 28 which is able to show a vertical motion. Upward motion of the displacement member 28 may push up the lift lever 26 so that the contact portion provided at the free end 26a of the lift lever 26 pushes up the bottom surface of the spring plate supporting member 20 until the magnetic field modulation head 10 is separated from the surface of the photomagnetic disc 12. Downward motion of the displacement member 28 stops pushing up the lift lever 26 so that the contact portion provided at the free end 26a of the lift lever 26 may be separated from the bottom surface of the spring plate supporting member 20. This may permit the spring plate supporting member 20 to make the magnetic field modulation head 10 contact with the surface of the photomagnetic disc 12.

The supporting and connecting member 18 comprising the spring plate supporting member 20 and the conductive plate connecting member 22 may be provided to be movable in a diametrical direction of the photomagnetic disc 12 so that the magnetic field modulation head 10 may also be movable in the diametrical direction in contact with the surface of the photomagnetic disc 12 with a rotation for storing information into the photomagnetic disc 12 or the photomagnetic recording.

The conventional supporting and connecting member 18 has, however, problems as described below. The conventional apparatus 18 for mechanically supporting and electrically connecting the magnetic field modulation head 10 has a complicated structure as comprising two separated members consisting of the spring plate supporting member 20 for only mechanically supporting the magnetic field modulation head 10 and the flexible conductive plate connecting member 22 for electrically connecting the magnetic field modulation head 10. A plurality of different fasteners 20a and 22a are necessary to mount the magnetic field modulation head 10 to each of the spring plate supporting member 20 and the conductive plate connecting member 22. In the prior art, the complicated structure of the supporting and connecting apparatus requires a large number of parts as well as complicated fabrication processes. This leads to a costly product.

Moreover, the contact pressure of the magnetic field modulation head 10 on the surface of the photomagnetic disc 12 depends upon not only a spring constant of the spring plate supporting member 20 but also a flexibile of the conductive plate connecting member 22, while the contact pressure must be set just in a predetermined value precisely for realizing the photomagnetic recording. In practice, the problem of the contact pressure of the head 10 on the disc 12 is very serious as it seems difficult to obtain a stable contact pressure value of the magnetic field modulation head 10 due to two associated factors, namely both the spring constant and the flexibility.

Furthermore, the above conventional supporting and connecting apparatus has a further serious problem with the accuracy of the positioning of the magnetic field modulation head 10. Cooperation of the spring plate supporting member 20 with the conductive plate connecting member 22 may cause a variation of a distance L of the magnetic field modulation head 10 from the vertical portion of the supporting frame 16. This results in difficulties in precisely positioning the magnetic field modulation head 10 on the photomagnetic disc 12. This problem as to the variation of the positioning of the magnetic field modulation head 10 is also very serious as it seems difficult to obtain a stable and precise positioning thereof.

To solve the above problems, it is therefore necessary to develop a novel apparatus for mechanically supporting and electrically connecting the magnetic field modulation head 10.

SUMMARY OF THE INVENTION

Accordingly, it is a primary object of the present invention to provide a novel apparatus for mechanically supporting and electrically connecting a magnetic field modulation head free from the problems as described above.

It is a further object of the present invention to provide a novel apparatus for mechanically supporting and electrically connecting a magnetic field modulation head, which has a simple structure.

It is a furthermore object of the present invention to provide a novel apparatus for mechanically supporting and electrically connecting a magnetic field modulation head, which permits the head to contact with a photomagnetic disc at a precise and stable contact pressure.

It is a still further object of the present invention to provide a novel apparatus for mechanically supporting and electrically connecting a magnetic field modulation head, which permits a stable and precise positioning of the head.

The above and other objects, features and advantages of the present invention will be apparent from the following descriptions.

The invention provides an apparatus for mechanically supporting and electrically connecting a magnetic field modulation head at least involving a coil and a core to a supporting frame to permit the head to be slidable on a surface of a photomagnetic disc and to be positioned in opposition to a laser beam pick up device. The apparatus may comprise a spring plate member connected at its one end to the head and being connected at its opposite end to the supporting frame to mechanically support the head. The spring plate member may include use it least a conductive part made of an electrically conductive material extending between its opposite ends to electrically connect the head to the supporting frame. The spring plate member may comprise a pair of slender pieces made of an electrically conductive material in which the slender pieces are spaced apart and in parallel to each other. The paired slender pieces are provided with an engaging element made of an insulting material for engaging the slender pieces with each other. The spring plate member may comprise a single slender body made of an insulating material and a pair of slender pieces made of an electrically conductive material extending between opposite ends of the body. The slender pieces are so formed in a surface of the body as to be spaced apart and parallel to each other. The electrically conductive material may be phosphor bronze or beryllium copper. The instigating material may be a flexible synthetic resin.

BRIEF DESCRIPTION OF THE DRAWINGS

Preferred embodiments of the present invention will hereinafter be described in detail with reference to the accompanying drawings.

PREFERRED EMBODIMENTS OF THE INVENTION

Figure 1A:
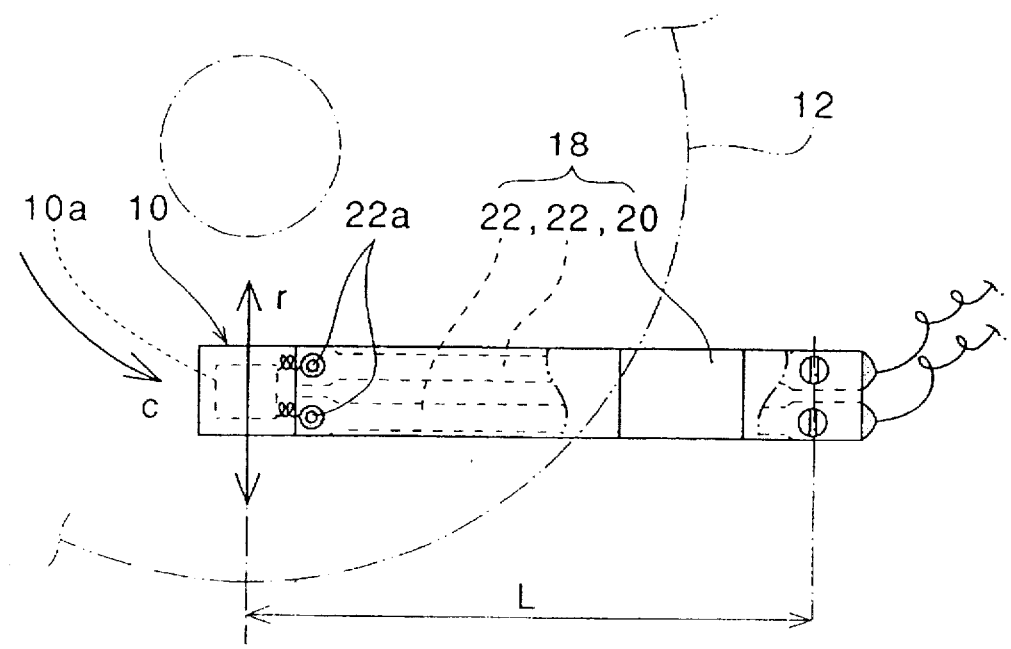
FIG. 1A is a plane view illustrative of the conventional apparatus for mechanically supporting and electrically connecting a magnetic, field modulation head.
Figure 1B:
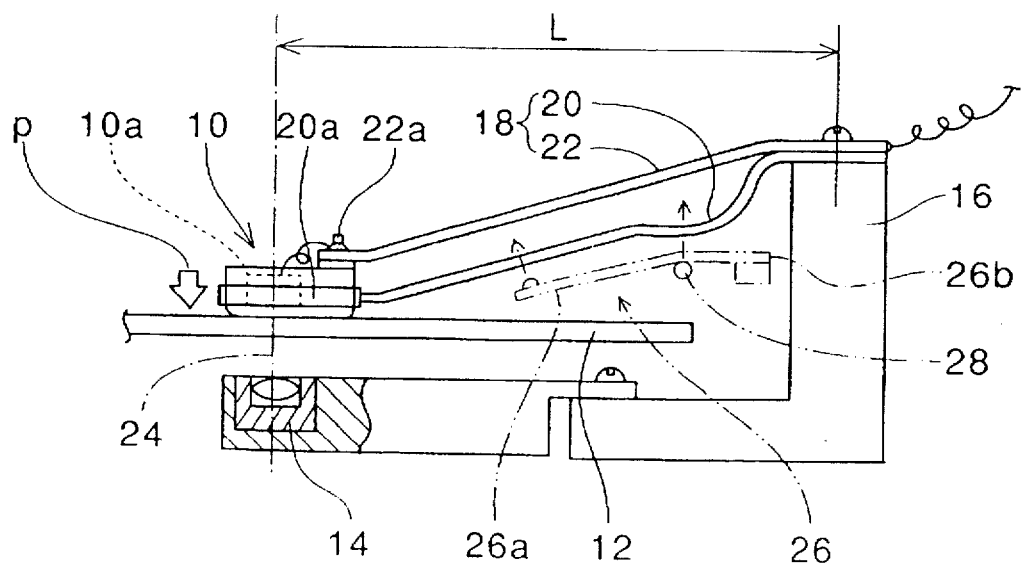
FIG. 1B is a vertical view illustrative of the conventional apparatus for mechanically supporting and electrically connecting a magnetic field modulation head.
Figure 2:
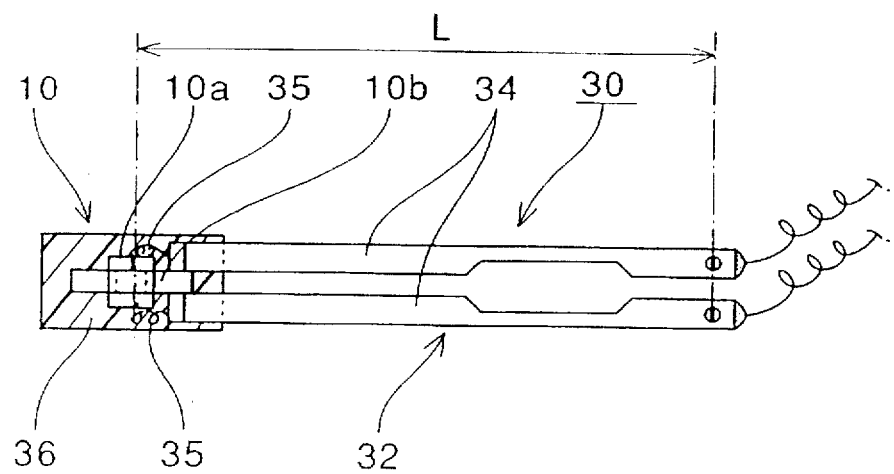
FIG. 2A is a plane view illustrative of a novel apparatus for mechanically supporting and electrically connecting a magnetic field modulation head in a first embodiment according to the present invention.
FIG. 2B is a vertical view illustrative of a novel apparatus for mechanically supporting and electrically connecting a magnetic field modulation head in a first embodiment according to the present invention.
Figure 2:
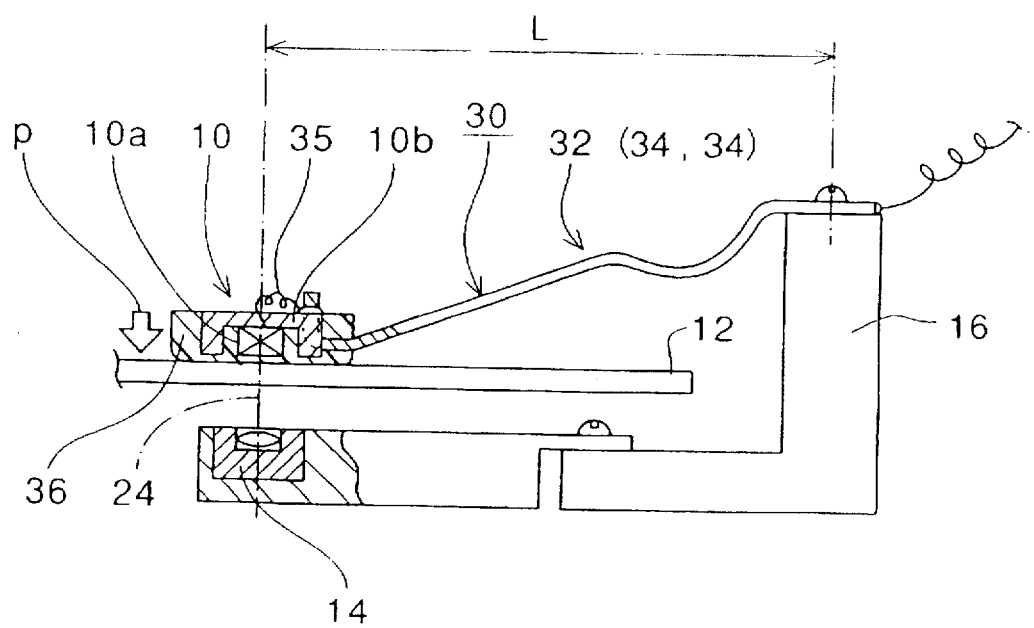

A first embodiment according to the present invention provides a novel apparatus for mechanically supporting and electrically connecting a magnetic field modulation head, which will be described with reference to FIGS. 2A and 2B. A photomagnetic recording is carried out by contacting a magnetic field modulation head 10 with a surface of a photomagnetic disc 12 at such a contact pressure as to allow the magnetic modulation head 10 to be slidable on the surface of the photomagnetic disc 12. The magnetic field modulation head 10 involves a magnetic field modulation coil 10a and a core 10b, both of which are embedded within a synthetic resin material 36 in which a polyacetal resin, a nylon resin, polyamide resins and a liquid crystal polymer are available.

The magnetic field modulation head 10 is not only mechanically supported by but also electrically connected with a supporting and connecting apparatus 30 comprising a pair of conductive spring plate supporting members 34 adjacent to but spaced apart from each other. Each of the conductive spring plate supporting members 34 is mechanically mounted and electrically connected at its one end to the magnetic field modulation head 10. Each of the conductive spring plate supporting members 34 is mechanically fixed at its opposite end to a top of a supporting frame 16 for mechanically supporting the magnetic field modulation head 10. Each of the conductive spring plate supporting members 34 has a bent portion whose width is narrowed to obtain such a flexibility as permiting the magnetic field modulation head 10 to exhibit a vertical motion to the surface of the photomagnetic disc 12. Each of the conductive spring plate supporting members 34 is further made of an electrically conductive material such as a phosphor bronze and a beryllium copper to permit a transmission of electrical signals into the coil 10a involved in the magnetic field modulation head 10.

The supporting frame 16 is L-shaped so as to extend upward and also extends in a lateral direction in parallel to but apart from the photomagnetic disc 12. A laser beam pick up device 14 is provided within an end of the laterally extended portion of the supporting frame 16 wherein the laser beam pick up device 14 is located at an opposite position to the magnetic field modulation head 10 through the photomagnetic disc 12 in which the magnetic modulation coil 10a involved in the magnetic field modulation head 10 is positioned on an optical axis 24 of a lens in the laser beam pick up device 14.

A lift lever which its not illustrated but is the same as the prior art may be provided for pushing up a bottom surface of the paired conductive spring plate supporting members 34 to permit the magnetic field modulation head 10 to be apart from the surface of the photomagnetic disc 12. In detail, the lift lever has a fixed end and a free end with a contact portion. The lift lever is provided at its under surface with a displacement member not illustrated but the same as the prior art, which is able to show a vertical motion. Upward motion of the displacement member may push up the lift lever so that the contact portion provided at the free end of the lift lever pushes up the bottom surface of the spring plate supporting member 20 until the magnetic field modulation head 10 is separated from the surface of the photomagnetic disc 12. Downward motion of the displacement member discontinues to push up the lift lever so that the contact portion provided at the free end of the lift lever may be separated from the bottom surface of the paired conductive spring plate supporting members 34. This may permit the paired conductive spring plate supporting members 34 to make the magnetic field modulation head 10 contact with the surface of the photomagnetic disc 12.

The paired conductive spring plate supporting members 34 may be provided to be movable in a diametrical direction of the photomagnetic disc 12 so that the magnetic field modulation head 10 may also be movable in the diametrical direction in contacting with the surface of the photomagnetic disc 12 with a rotation for storing informations into the photomagnetic disc 12 or the photomagnetic recording.

The novel supporting and connecting member 30 has advantages as described below. The novel apparatus 30 for mechanically supporting and electrically connecting the magnetic field modulation head 10 has a simple structure as comprising the paired conductive spring plate supporting members 34, each of which has an ability to provide not only a mechanical supporting but also an electrical connection of the magnetic field modulation head 10. The simple structure of the supporting and connecting apparatus 30 requires a small number of parts as well as a simple fabrication process. This leads to a considerable reduction in the cost of the product.

The contact pressure of the magnetic field modulation head 10 on the surface of the photomagnetic disc 12 depends only upon the spring constant of the paired conductive spring plate supporting members 34. This simple structure of the paired conductive spring plate supporting members 34 is able to facilitate a precise setting of the contact pressure at a predetermined value and obtain a stable contact pressure for realizing the photomagnetic recording.

Moreover, the above novel supporting and connecting apparatus 30 is able to realize a high accuracy of positioning of the magnetic field modulator head 10. The simple structure of the supporting and connecting apparatus 30 may also keep a constant distance L of the magnetic field modulation head 10 from the vertical portion of the supporting frame 16. This results in a stable and precise positioning of the magnetic field modulation head 10 on the photomagnetic disc 12.

Figure 3A:
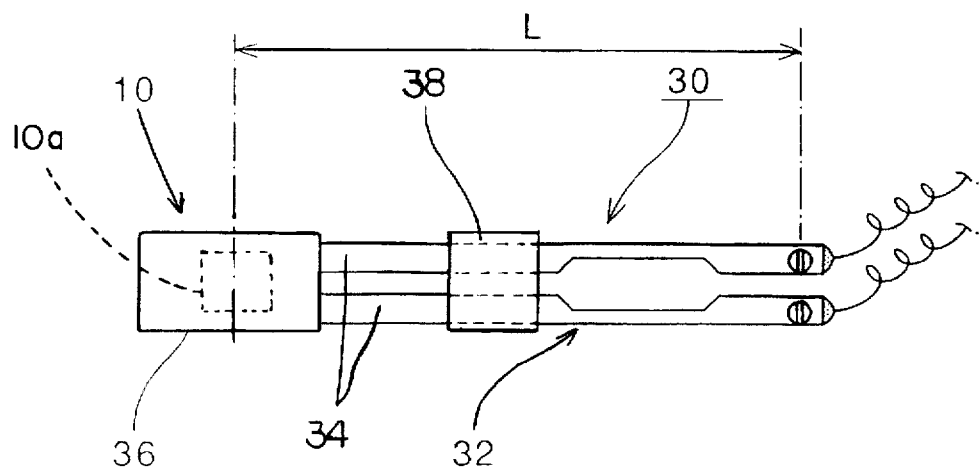
FIG. 3A is a plane view illustrative of a novel apparatus for mechanically supporting and electrically connecting a magnetic field modulation head in a second embodiment according to the present invention.
Figure 3B:
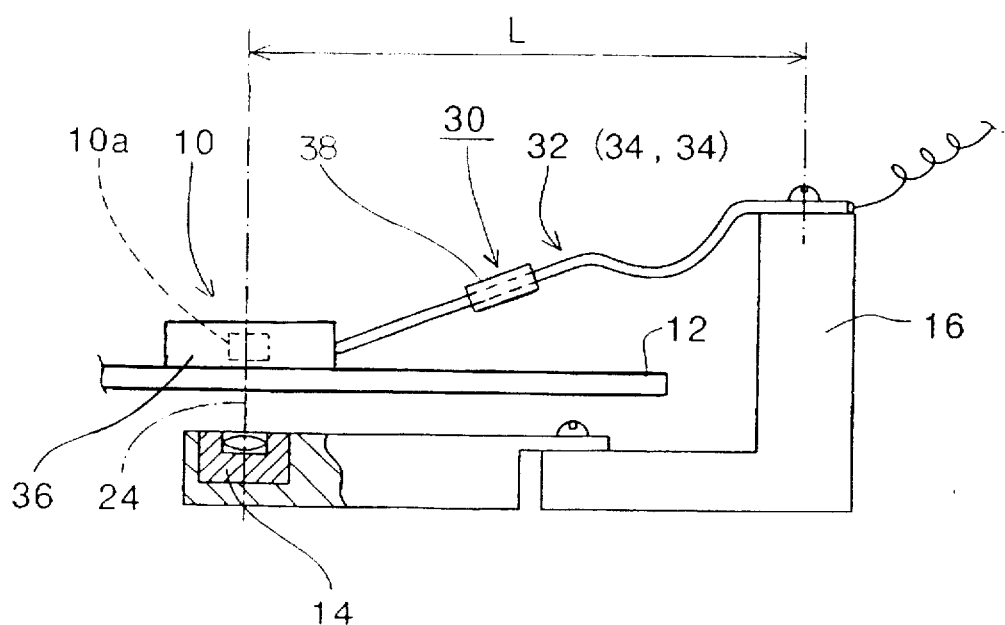
FIG. 3B is a vertical view illustrative of a novel apparatus for mechanically supporting and electrically connecting a magnetic field modulation head in a second embodiment according to the present invention.

A second embodiment according to the present invention provides a novel apparatus for mechanically supporting and electrically connecting a magnetic field modulation head, which will be described with reference to FIGS. 3A and 3B. A supporting and connecting apparatus 30 of this embodiment has a structural difference from that of the first embodiment in providing an engaging element 38 which may be made of an insulating material such as a polyacetal resin, a nylon resin, polyamide resins and a liquid crystal polymer. Thus, the supporting and connecting apparatus has the same structure as that of the first embodiment except in providing the engaging element 38. The engaging element 38 may be provided to engage mechanically the paired conductive spring plate supporting members 34 in the vicinity of those center portions except for those bent portions so as to obtain a further stability in the contact pressure of the magnetic field modulation head 10 on the photomagnetic disc 12. The engaging element 38 may further permit the magnetic field modulation head 10 to be free from any vibration, namely is able to solve a problem with a stress due to the vibration of the magnetic field modulation head 10.

Figure 4A:
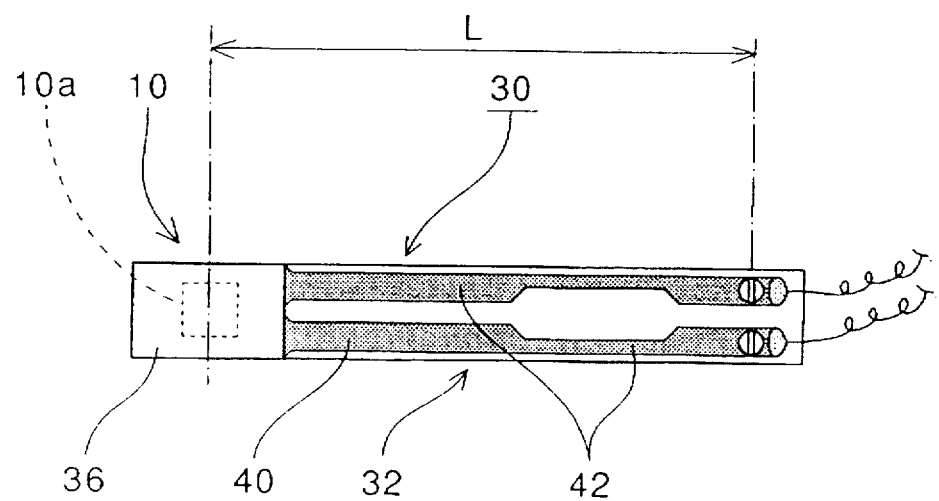
FIG. 4A is a plane view illustrative of a novel apparatus for mechanically supporting and electrically connecting a magnetic field modulation head in a third embodiment according to the present invention.
Figure 4B:
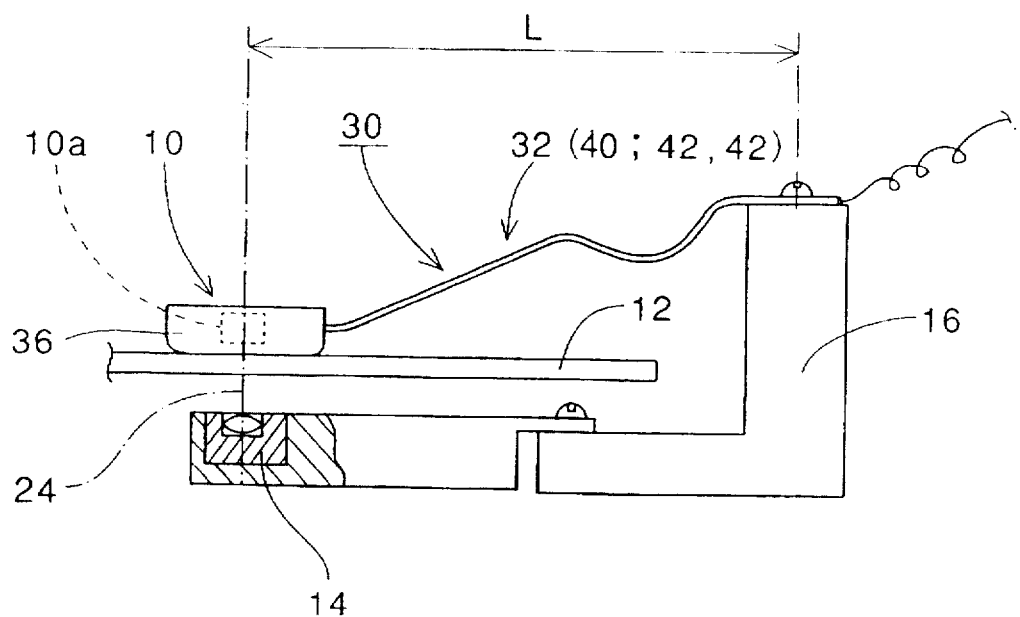
FIG. 4B is a vertical view illustrative of a novel apparatus for mechanically supporting and electrically connecting a magnetic fields modulation head in a third embodiment according to the present invention.

A third embodiment according to the present invention provides a novel apparatus for mechanically supporting and electrically connecting a magnetic field modulation head, which will be described with reference to FIGS. 4A and 4B. A supporting and connecting apparatus 30 comprises a spring plate supporting member 40 with conductive parts 42 formed on the spring plate supporting member 40. The spring plate supporting member 40 may be made of flexible insulating materials such as polyimide resins and polyamideimide resins. The conductive parts 42 may be so shaped as the shape of the paired conductive spring plate supporting member 34. The conductive parts 42 may be made of phosphor bronze or beryllium copper. The conductive parts 42 are formed so as to be united within the spring plate supporting member 40. Further the conductive parts 42 and the spring plate supporting member 40 may be formed in the same process. The simple structure of the supporting and connecting apparatus 30 requires a small number of parts as well as a simple fabrication process. This leads to a considerable reduction in the cost of the product. The above united structure of the supporting and connecting member 30 may provide a further stability in the contact pressure of the magnetic field modulation head 10 on the photomagnetic disc 12. The United structure of the supporting and connecting member 30 may further permit the magnetic field modulation head 10 to be free from any vibration, namely the above structure is able to solve a problem with a stress due to the vibration of the magnetic field modulation head 10.

Whereas modifications of the present invention will no doubt be apparent to a person having ordinary skill in the art, to which the invention pertains, it is to be understood that the embodiments shown and described by way of illustrations are by no means intended to be considered in a limiting sense. Accordingly, it is to be intended to cover all modifications by the claims which fall within the sprit and scope of the invention.

What is claimed is:

1. An improved support for suspending a magnetic field modulation head from a frame, wherein the support also provides an electrical connection for the head and imparts a force to the head so that the head exerts pressure on a recording disc on which the head slideably moves, the improvement wherein the support comprises:

two, generally linear, substantially similar, electrically conductive bars which are the only connection between the head and the frame, said two bars being spaced apart and arranged side-by-side in a plane angled with respect to a plane of the recording disc and with substantially parallel longitudinal axes, each of said bars having a first end affixed to the frame and a second end affixed to the head, and having a substantially constant width and thickness between said two ends except for a spring portion with a narrower width which is bent with a constant curvature toward the plane of the recording disc and out of the plane of said two bars to impart flexibility thereto, said bent spring portion with a narrow width having a length that is between one-quarter and one-half a length of each said bar, wherein said two bars together suspend the head from the frame, provide the electrical connection for the head, and impart the force to the head, and wherein said support further comprises an electrically insulative, laterally arranged crossbar affixed to said two electrically conductive bars about one-half a distance between a middle of said spring portion and said second end for stabilizing said two bars.

2. The support of claim 1, wherein said crossbar has a length that is less than one-quarter the length of each said bar.

3. The support of claim 2, wherein said crossbar length is about one-sixth the length of each said bar.

4. The support of claim 1, wherein said length of said bent spring portion is about one-third the length of each said bar.

5. An improved support for suspending a magnetic field modulation head from a frame, wherein the support also provides an electrical connection for the head and imparts a force to the head so that the head exerts pressure on a recording disc on which the head slideably moves, the improvement wherein the support comprises:

two, generally linear, substantially similar, electrically conductive members attached in their entirety to an electrically insulative support plate which is angled with respect to a plane of the disc, said members and said plate being the only connection between the head and the frame, said two members being spaced apart and having substantially parallel longitudinal axes, each of said members and said plate having a first end affixed to the frame and a second end affixed to the head, said two members having a substantially constant width and thickness between said two ends except for a spring portion with a narrower width which is bent with a constant curvature toward the plane of the recording disc and out of a plane of said plate to impart flexibility thereto, said plate having a substantially constant width and thickness between said two ends and having a portion bent with a constant curvature toward the plane of the recording disc out of the plane of said plate and corresponding to said bent spring portion, said bent spring portion with a narrow width having a length that is between one-quarter and one-half a length of each said bar, wherein said two members and said plate together suspend the head from the frame and impart the force to the head, and wherein said two members provide the electrical connection for the head.

6. The support of claim 5, further comprising an electrically insulative, laterally arranged crossbar affixed to said two electrically conductive bars about one-half a distance between a middle of said spring portion and said second end for stabilizing said two bars.

* * * * *